D. T. SNELBAKER.
Wagon Brake.
No. 95,946.
Patented Oct 19, 1869.
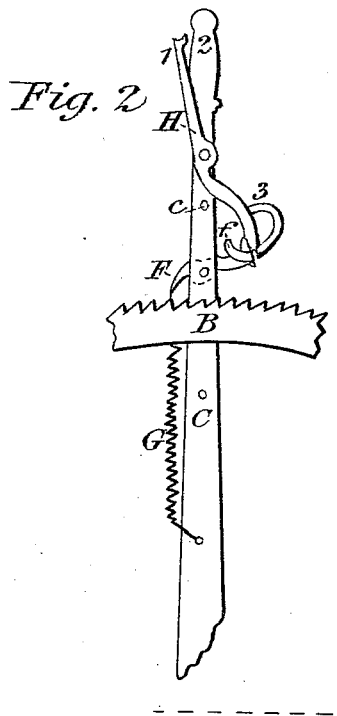
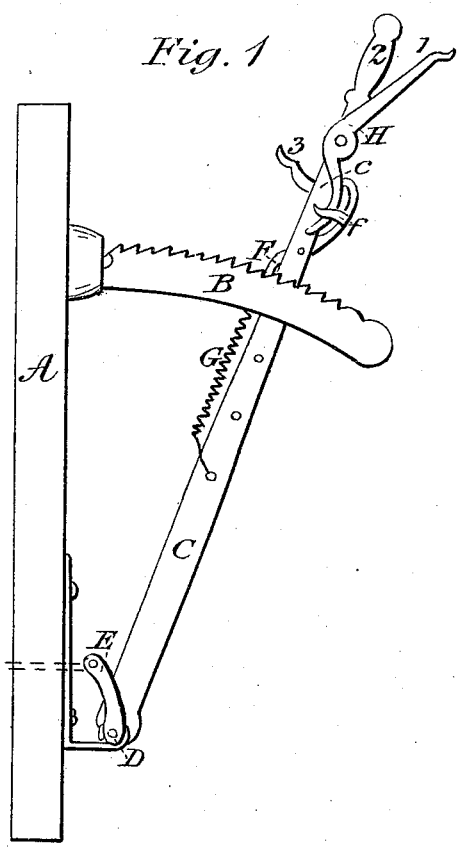
Witnesses:
T. Van Kamel
Geo. Boyle
Inventor:
David T. Snelbaker

United States Patent Office.

DAVID T. SNELBAKER, OF CINCINNATI, OHIO, ASSIGNOR TO ALEXANDER DELORAC, OF SAME PLACE.

Letters Patent No. 95,946, dated October 19, 1869.

IMPROVEMENT IN WAGON-BRAKES.

The Schedule referred to in these Letters Patent and making part of the same.

*To all whom it may concern:*

Be it known that I, DAVID T. SNELBAKER, of Cincinnati, county of Hamilton, and State of Ohio, have invented a new and useful Improvement in Wagon-Brake Locks; and I do hereby declare that the following is a full, clear, and exact description thereof, reference being had to the annexed drawings, making a part of this specification, in which—

Figure I is a side elevation of the same, and

Figure II is a detached part, showing the brake inoperative.

Similar letters of reference indicate like parts.

My invention relates to a device for locking a wagon-brake in such a manner that it cannot become detached by the jolting of the wagon, or other like accident, and at the same time it is so arranged as to be easily operated by the foot or hand.

It is not liable to get out of order, and is provided with a means to throw it entirely out of action when this is desired.

In construction, my invention is as follows:

A, Fig. I, represents the front end of a wagon-bed, to which the ratchet B is bolted.

C is a lever, firmly secured to the shaft D.

The ratchet B is made double, the two parts forming a guide for the lever C.

The arms E are a continuation of the shaft D, to which rods are attached, operating the brakes.

The pawl F engages with the ratchet B, and holds the lever C at any desired point.

A spiral spring, G, attached to the lever C and the pawl F, holds the latter firmly against the ratchet.

The pawl F is continued some distance back of its attachment, and is provided with a limb, *f*, with which the forked lever H engages.

A simple projection, *c*, on lever C, with the limb *f* on pawl F, serves to keep the lever H in place.

The operation of my invention becomes obvious.

When it is desired to lock the wagon, the lever C is forced forward, and the pawl held against the ratchet by the spring G, holds the lever wherever it may be released.

When the wagon is to be unlocked, the hand grasps the ends of the two levers at 1 and 2. The lower end of lever H is thus forced against the limb *f* of pawl F, raising it free from the ratchet, when the lever may be swung back, thus releasing the wheels from contact of the brakes.

When it is inconvenient to use the hand to unlock the wagon, the foot may be placed on the end of pawl F at 3, which, by being depressed, also raises it free from the ratchet, and the lever can be swung to the operator by the same movement.

In either of these operations the brake can be thrown out of action by sufficiently depressing the pawl F to allow the fork of lever H to engage with the limb *f*.

Having thus described the construction and operation of my invention,

What I claim as new, and desire to secure by Letters Patent, is—

The pawl F, with limb *f* and spring G, or its equivalent, in combination with the ratchet B and levers H and C, arranged and operating substantially as and for the purpose set forth.

DAVID T. SNELBAKER.

Witnesses:
T. VAN KANNEI,
GEO. BOYLE.